United States Patent Office 2,766,363
Patented Oct. 9, 1956

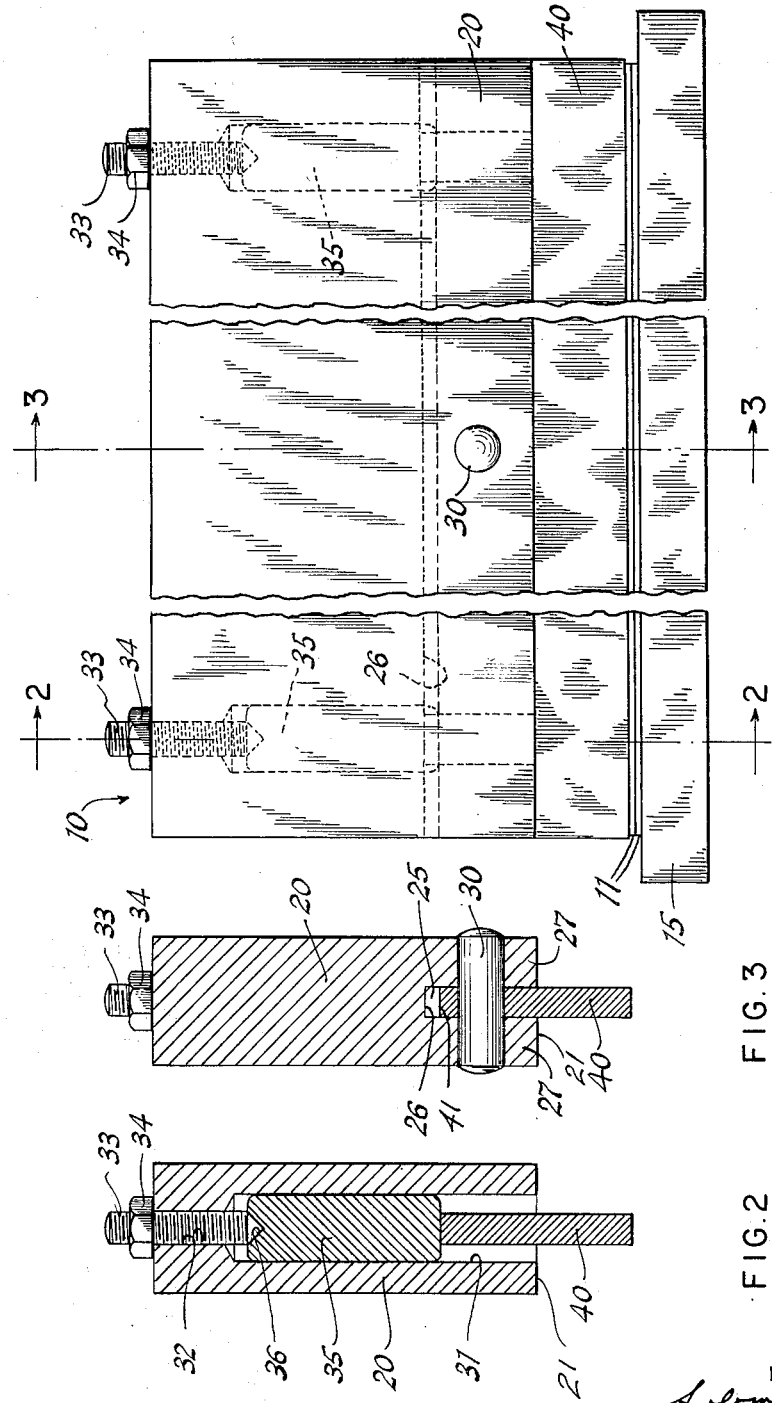
Oct. 9, 1956  S. SCHWARTZ ET AL  2,766,363
ELECTRODE SUPPORT ASSEMBLY
Filed Dec. 17, 1953

2,766,363

ELECTRODE SUPPORT ASSEMBLY

Solomon Schwartz, Woodmere, and Martin Kaplan, Bellerose, N. Y., assignors to Radio Receptor Company, Inc., Brooklyn, N. Y., a corporation of New York Application December 17, 1953, Serial No. 398,694

6 Claims. (Cl. 219—10.81)

This invention relates to an electrode support assembly for electrodes used in localized heating of thermoplastic material and, more particularly, to such an assembly in which the distortive effects of thermal expansion are minimized and the electrode can be conformed to surfaces which are not completely flat or regular.

Electrode assemblies of the type to which the present invention is directed are utilized to apply localized heat and pressure to thermoplastic material. Such pressure and heating is used, for example, to form a seam or seal between two, or more thermoplastic sheets, as in the formation of bags or receptacles, or to emboss thermoplastic material.

As presently constituted, such electrode assemblies comprise a relatively rigid mounting or backing member supporting a bar of electrically conductive material constituting the actual electrode. The electrode, which may be of copper or a copper containing alloy, such as brass, is connected to one terminal of a source of electric power and then pressed by the backing member against the thermoplastic work. The latter is supported on a lower press platen which may be connected to the other terminal of the source. Alternatively, the power source may be connected to opposite ends of the electrode.

As the electrode itself is of relatively ductile metal, for electrical and heat conductivity purposes, its backing member or holder must be of relatively rigid and strong metal so as to provide adequate support for the electrode at the pressures involved. Consequently, the combination of the electrode, or bar, and its holder or support involves a union or association of dissimilar metals.

After a limited period of operation, the heating of the electrode assembly results in an operating temperature sufficiently high to effect appreciable thermal expansion in the electrode and in its holder. These two elements, being of dissimilar metal, expand at different rates when heated. This unequal thermal expansion of the components results in distortion and relative displacement of the electrode or bar so that adequate contact over the full work area to be heated cannot be obtained. Additionally, with the electrode bar rigidly connected to its holder, the electrode can not readily be adjusted to compensate for work surface variations, as may be due to slight convexity of the lower or work supporting platen.

To avoid the aforementioned difficulties and provide an easily adaptable and adjustable electrode assembly, the present invention is directed to a novel arrangement in which an electrode bar of electrically conductive material is floatingly mounted in a relatively rigid holder provided with electrode adjustment means. More particularly, an elongated, rigid holder, preferably of steel, has a channel extending along one edge and receiving an electrode bar of copper, brass, or the like. The side surfaces of the bar are in substantially surface engagement with the flanges of the channel, intermediate its ends, the electrode bar is pivotally mounted in the channel for rocking therein about the pivot axis. Adjacent either end of the electrode holder are adjustment devices engaged with the inner edge of the electrode bar, and other adjustment devices may be provided intermediate the ends of the holder and the bar pivot.

With this arrangement, the adjusting devices can be suitably manipulated to adjust the position of the electrode bar relative to the holder. Thus, when the bar thermally expands it may be adjusted or warped to maintain its outer edge in conformity with the work and its supporting platen. Also, the bar may be initially adjusted to compensate for the shape of the lower platen to assure full engagement between the bar and the work over the work areas to be heated.

For an understanding of the invention principles, reference is made to the following description of a typical embodiment thereof as illustrated in the accompanying drawings.

In the drawings:

Fig. 1 is a side elevation view of an electrode assembly incorporating the invention, in operative association with thermoplastic work supported on a platen; and Figs. 2 and 3 are transverse sectional views of the assembly, taken on the correspondingly numbered section lines of Fig. 1.

Referring to the drawing, the electrode assembly 10 of the invention is shown, in Fig. 1, in operative association with a pair of thermoplastic sheets, 11, 11, supported on a lower work supporting platen 15. Assembly 10 includes a holder 20 and an electrode or bar 40. Bar 40 is shown pressed into contact with workpieces 11 through pressure applied to holder 20. In the illustrated set-up, assembly 10 is forming an elongated seam between sheets 11, 11 by heating thermoplastic sheets due to the heat effect developed in electrode or bar 40.

Holder 20 is an elongated, substantially rectangular bar of a suitable relatively rigid metal, such as steel. Along its lower edge 21, holder 20 is provided with a channel 25 having a width substantially equal to the thickness of electrode bar 40.

Bar 40 is nested in channel 25 with its inner edge 41 spaced somewhat from the base 26 of the channel and its sides substantially engaged with the channel flanges 27. The bar is substantially the same length as holder 20 and is swingably supported in channel 25 by a pin 30 at substantially the midpoint of holder 20 and bar 40. The electrode bar 40 thus has a floating mount in holder 20.

Adjacent either end of holder 20, a recess 31 is formed, extending upwardly from channel 25. The diameter of these recesses may be substantially greater than the width of channel 25. Each recess 31 receives a plug or bar 35 having an axial conical recess 36 in its upper end. Recesses 31 are continued as smaller diameter, threaded recesses 32, each receiving a conically pointed stud 33 provided with a locknut 34. The points of studs 33 engage the conical recesses 36 in plugs 35, and the lower ends of plugs 35 engage the inner edges of bar 40.

By suitable adjustment of studs 33, transmitted through plugs 35 to bar 40, the bar can be adjusted about its pivot 30 to assure conformity of its lower edge to the contour of work 11 or platen 15. Any distortion of bar 40 due to heating can be compensated by adjustment of studs 33, the adjusted position being retained by locknuts 34. While only two adjusting means have been shown to exemplify the invention, more may be provided between the ends of holder 20 and pivot 30, particularly, in the case of longer electrode assemblies.

While a specific embodiment of the invention has been shown and described in detail to illustrate the application of the invention principles, it will be understood that the invention may be embodied otherwise without departing from such principles.

We claim:

1. In an electrode assembly for applying heat and pressure to localized areas of thermoplastic material, the combination of an electrode holder comprising an elongated substantially flat bar of relatively rigid metal; an electrode comprising an elongated substantially flat bar of electrically conductive material, means pivotally mounting said electrode on said holder with the outer edge of said electrode being disposed outwardly of the adjacent outer edge of said holder; and adjustment means on said holder on either side longitudinally of such pivotal mounting means engaged with the inner edge of said electrode to adjust the position of the outer edge of said electrode relative to such adjacent outer edge of said bar.

2. In an electrode assembly for applying heat and pressure to localized areas of thermoplastic material, the combination of an electrode holder comprising an elongated substantially flat bar of relatively rigid metal; an electrode comprising an elongated substantially flat bar of electrically conductive material; means pivotally mounting said electrode on said holder with at least a side face of said electrode in substantially surface engagement with a face of said holder and the outer edge of said electrode being disposed outwardly of the adjacent outer edge of said holder; and adjustment means on said holder on either side longitudinally of such pivotal mounting means and engaged with the inner edge of said electrode to adjust the position of the outer edge of said electrode relative to such adjacent outer edge of said bar.

3. In an electrode assembly for applying heat and pressure to localized areas of thermoplastic material, the combination of an electrode holder comprising an elongated substantially flat bar of relatively rigid metal; an electrode comprising an elongated substantially flat bar of electrically conductive material; means pivotally mounting said electrode at a point intermediate its ends on said holder with at least a side face of said electrode in substantially surface engagement with a face of said holder and the outer edge of said electrode being disposed outwardly of the adjacent outer edge of said holder, for movement in a plane parallel to such side face of said electrode; and adjustment means on said holder on either side longitudinally of such pivotal mounting means and engaged with the inner edge of said electrode to adjust the position of the outer edge of said electrode relative to such adjacent outer edge of said bar.

4. In an electrode assembly for applying heat and pressure to localized areas of thermoplastic material, the combination of an electrode holder comprising an elongated substantially flat bar of relatively rigid metal, said electrode holder having a channel extending along an outer edge thereof; an electrode comprising an elongated substantially flat bar of electrically conductive material; means pivotally mounting said electrode in said channel with the outer edge of said electrode being disposed outwardly of the adjacent outer edge of said holder; and adjustment means on said holder on either side longitudinally of such pivotal mounting means and engaged with the inner edge of said electrode to adjust the position of the outer edge of said electrode relative to such adjacent outer edge of said bar.

5. In an electrode assembly for applying heat and pressure to localized areas of thermoplastic material, the combination of an electrode holder comprising an elongated substantially flat bar of relatively rigid metal, said electrode holder having a channel extending along an outer edge thereof; an electrode comprising an elongated substantially flat bar of electrically conductive material; means pivotally mounting said electrode at a point intermediate its ends in said channel with the outer edge of said electrode being disposed outwardly of the adjacent outer edge of said holder; and adjustment means on said holder on either side longitudinally of such pivotal mounting means and engaged with the inner edge of said electrode to adjust the position of the outer edge of said electrode relative to such adjacent outer edge of said bar.

6. In an electrode assembly for applying heat and pressure to localized areas of thermoplastic material, the combination of an electrode holder comprising an elongated substantially flat bar of relatively rigid metal, said electrode holder having a channel extending along an outer edge thereof; an electrode comprising an elongated substantially flat bar of electrically conductive material, means pivotally mounting said electrode at a point intermediate its ends in said channel with the the outer edge of said electrode being disposed outwardly of the adjacent outer edge of said holder; at least a pair of studs adjustably mounted in said holder and extending toward said channel on either side longitudinally of such pivotal mounting means; and at least a pair of plugs each extending into said channel in alignment with a stud and engaged with the inner edge of said electrode to adjust the position of the outer edge of said electrode relative to such adjacent outer edge of said bar.

References Cited in the file of this patent

UNITED STATES PATENTS

| 2,457,659 | Graham et al. | Dec. 28, 1948 |

FOREIGN PATENTS

| 624,329 | Great Britain | June 2, 1949 |
| 647,762 | Great Britain | Dec. 20, 1950 |